Jan. 23, 1951     A. S. BETTENCOURT     2,539,225

SANDWICH SPREADER

Filed Sept. 17, 1949

INVENTOR.
Alfred S. Bettencourt
BY
    Peter J. Taylor
ATTORNEY

Patented Jan. 23, 1951

2,539,225

UNITED STATES PATENT OFFICE 2,539,225

SANDWICH SPREADER

Alfred S. Bettencourt, East Orange, N. J.

Application September 17, 1949, Serial No. 116,307

5 Claims. (Cl. 65—36)

This invention relates to devices used for spreading butter, cheese, and other pasty materials onto slices of bread and similar food products.

Figure 1:
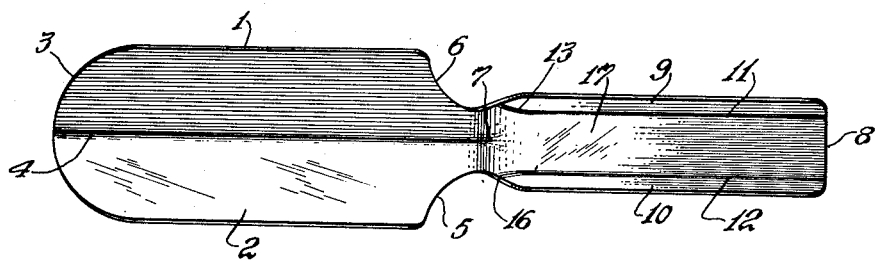
Figure 2:
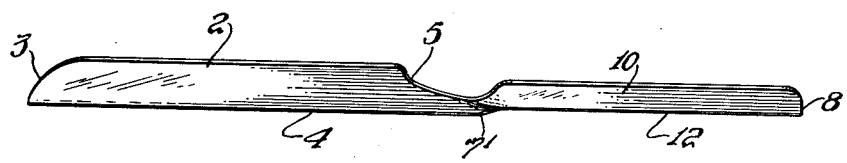
Figure 3:
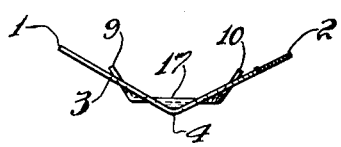
Figure 4:
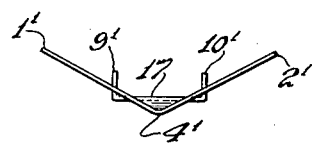
Figure 5:
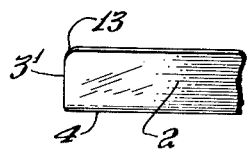
Figure 6:
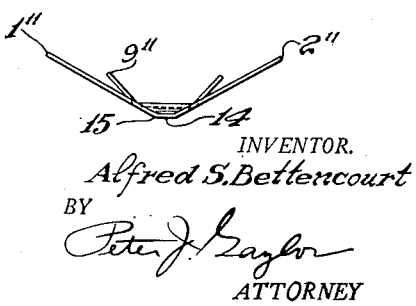

The invention may be more readily understood from the accompanying drawing in which Figure 1 depicts a top or plan view of a preferred form of device, while a side view of the same device is illustrated in Figure 2 and a front end view in Figure 3. Figures 4 and 6 show front end views of various modifications of the device of the present invention, while Figure 5 is a fragmentary side view of the device shown in Figure 4. Similar numerals refer to similar parts in the various figures.

Referring again to the drawing, numeral 1 represents the spreading portion of the device while numeral 8 represents the handle portion. The spreading portion comprises flat walls 1 and 2, forming an obtuse angle of about 130° with each other, and connected together by rounded angle section 4 which may be circular, as in Fig. 3, or of other arcuate form, such as elliptical, or angular, such as 4' in Fig. 4, or, sides 1 and 2 may be joined by a narrow flat piece 14 which forms a channel having wide angularly disposed walls 1" and 2".

The front portions 3 of plates 1 and 2 may be tapered in rounded fashion, as in Fig. 1, or may be provided with rounded square corners 13, as in Fig. 5. The tapered form is preferred.

Handle portion 8 is made of the same strip as the forward or plate portion, and the whole unit may be made in a simple stamping operation. This handle portion comprises flat plate 17, about ⅔ the width of blade 1. Protruding from the sides 11 and 12 of plate 17 are lips 9 and 10 which are preferably a little less than ½ the width of plate 17.

The portion between handle 8 and blades 1 and 2 is preferably narrowed by arcuate or circular cut out sections 5 and 6. Also, the indentation 4 between blades 1 and 2 is continued as indentation 7 through the narrowed portion and past the ends of bends 12 and 13 which terminate at tapered ends 16 of lips 9 and 10 of the handle. Such a structure provides considerable strength to the narrowed portion between the handle and the blades. Although lips 9 and 10 may protrude at right angles to plate 17, as in Fig. 4, it is preferable that they be at an oblique angle thereto, say at an angle of about 110° with respect to plate 17, as in Figs. 3 and 6.

In operation, the handle portion 8 is taken in the hand so that angle 4 of blades 1 and 2 points downwardly. Then the bottom surfaces of blades 1 and 2 are dipped in scoop fashion into the container of soft butter, cheese, or the like, and the scooped-up mass is applied to the bread slice by first tilting blade 2 upwardly and running the rear portion of blade 1 forward (i. e. toward the operator), over the bread, and gradually lowering the forward portion of blade 1 as the butter is used up in the smearing or spreading operation. Excess of butter pushed out by blade 1 will accumulate on the under side of blade 2, since the outermost edge of blade 1 is kept in contact with the surface of the bread.

When all of the butter is consumed from the underside of blade 1, the device is tilted downwardly in the direction of the operator until angle or joint portion 4 touches the bread during the spreading operation. Then the butter is gradually rubbed off the underside of blade 2 until it is completely consumed.

It will be observed that the present device is much more efficient than a knife or single flat blade both as to capacity and elimination of lost time, since a knife has only about half the capacity and it must be reversed a number of times due to piling up of the spreading material on the upper surface of the knife.

An important feature of the present invention is the unitary construction of the blade and handle portions which provides a strong spreader which is easily cleaned and which has no crevices or concealed cracks to encourage germ growth. Furthermore, the entire unit is simple to stamp out and to stack. It is preferably made of stainless steel or silver plated steel, although aluminum, plastics, and other materials may be used.

When a circular or arcuate blade junction 4 is employed, as in Fig. 1, the spreading action is of the self-feeding type during the transition from blade 1 to blade 2. Such a spreader, as the one which is the subject of this invention, about 4" long, possesses a high capacity so that one scoop of butter, for example, will be sufficient for spreading at least 3 or 4 pieces of bread. Also, the device of the present invention is particularly effective in spreading icing on cakes or pastry.

It is possible to extend ridge 4 far into the handle portion, even to the outer edge 8.

I claim:

1. In a sandwich spreader having a blade portion and a handle portion, the improvement comprising two flat blades having a side edge of each disposed at an oblique angle to one another and joined together at the angle, thereby forming the blade portion, and a centrally disposed flat plate of width less than that of one of said blades and serving as an extension of said blades, narrow lips projecting from the side edges of said plate at an angle of at least 90° from said plate, said plate and lips forming the handle portion, and an intermediate portion having a width at least that of the plate and disposed between said blades and said handle, comprising a continuation of and joining together of said blades and plate.

2. A sandwich spreader according to claim 1 in which the angle made by said blades continues through said intermediate portion and enters the handle portion.

3. A sandwich spreader according to claim 1 in which the front ends of the blades are tapered in the form of an arcuate edge.

4. A sandwich spreader according to claim 1 in which the angle between the blades comprises an arcuate section.

5. A sandwich spreader according to claim 4 in which the lips form an oblique angle with the plate.

ALFRED S. BETTENCOURT.

REFERENCES CITED

The following references are of record in the file of this patent:

UNITED STATES PATENTS

| Number | Name | Date |
|---|---|---|
| 150,093 | Smith | Apr. 21, 1874 |
| 368,344 | Layer | Aug. 16, 1887 |
| 400,537 | Barry | Apr. 2, 1889 |
| 461,623 | Schoch | Oct. 20, 1891 |
| 600,592 | Moses | Mar. 15, 1898 |
| 1,432,412 | Rietveld | Oct. 17, 1922 |
| 2,011,910 | Robbins | Aug. 20, 1935 |
| 2,141,367 | Yannuzzi | Dec. 27, 1938 |
| 2,322,046 | Miller | June 15, 1943 |